United States Patent Office 3,651,145
Patented Mar. 21, 1972

3,651,145
NOVEL DIKETO COLORING AGENTS
Joseph Donald Surmatis, West Caldwell, N.J., assignor to Hoffmann-La Roche Inc., Nutley, N.J.
No Drawing. Original application June 23, 1967, Ser. No. 648,196. Divided and this application Apr. 24, 1969, Ser. No. 819,520
Int. Cl. C07c 49/54
U.S. Cl. 260—586 R         1 Claim

ABSTRACT OF THE DISCLOSURE

Novel $C_{40}$ and $C_{50}$ diketo coloring and pigmenting agents for foodstuffs and the like and a process for their production from hydroxenin including intermediates therein.

CROSS REFERENCE TO RELATED APPLICATION

This application is a divisional application of Ser. No. 648,196, filed June 23, 1967.

SUMMARY OF THE INVENTION

The present invention is concerned with diketo compounds of the formulae:

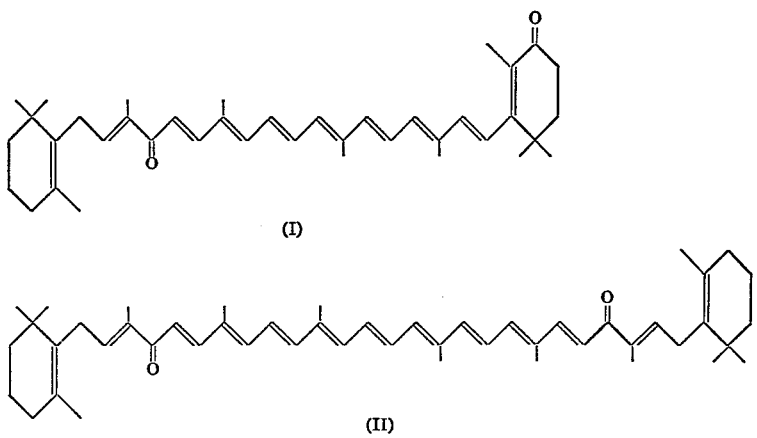

Both the compound of Formula I above which is called 1 - (2,6,6 - trimethyl-1-cyclohexenyl)-18-(2,6,6-trimethyl-3 - oxo - 1 - cyclohexenyl)-3,7,12,16-tetramethyloctadec-2,5,7,9,11,13,15,17-octaen-4-one and the compound of Formula II above which is called 1,26-bis(2,6,6-trimethyl-1 - cyclohexenyl) - 3,7,11,16,20,24-hexamethyl-hexacosa-2,5,7,9,11,13,15,17,19,21,24 - undecen-4,23-dione are yellow coloring and pigmenting agents for foodstuffs and the like.

The compounds of Formulae I and II above are especially suited for incorporation into poultry feeds to increase the pigmentation of the eggs so that an egg of a deep yellow yolk is produced. The feedstuff can contain the compounds of Formulae I and II above in an amount of from about 0.01 percent to 1.0 percent by weight, based upon the weight of the poultry feed.

DETAILED DESCRIPTION

The coloring agents of Formulae I and II above, in accordance with this invention, can be used to color any conventional foodstuff including beverages, fruits, vegetable preserves, marmalades, cream foods, confectionaries, edible fats, cheeses, fish products, pasta, soup powders, etc. Any conventional pharmaceutical preparation can be colored by compounds of Formulae I and II above. Among the typical pharmaceutical preparations which can be colored in accordance with this invention are included dragées, suppositories, gelatin capsules and syrups. Also any conventional cosmetic preparation can be colored with the compounds of Formulae I and II above. Among the conventional cosmetic preparations which can be colored in accordance with this invention are included, toothpaste, skin creams, lipsticks and non-alcoholic mouthwashes.

In coloring materials such as foodstuffs, cosmetic and pharmaceutical preparations, the compounds of Formulae I and II above should be added to the material in an amount sufficient to impart a color to the material. Generally, it is preferred that the foodstuffs, pharmaceutical and cosmetic preparations contain from about 0.0000001 part by weight to about 0.1 part by weight of the compounds of Formulae I and II above, based on the weight of the foodstuff, pharmaceutical and cosmetic preparation.

In coloring foodstuffs with the compounds of Formulae I and II, the compounds of Formulae I and II can be utilized either to supply a red color, a yellow color or a color in between red and yellow. The red color is produced by utilizing either the compound of Formula I or Formula II in a high concentration, i.e., above about 0.01% by weight. If a yellow color is desired the concentration of the compounds of Formula I or II should be used in a low concentration, i.e., below about 0.0001 part by weight.

The compounds of Formulae I and II can be also used in poultry feed to increase the pigmentation of eggs so that a deep yellow color is obtained.

The compounds of this invention are extremely advantageous for incorporation into poultry feeds as well as for coloring and pigmenting agents for foodstuffs, pharmaceutical preparations and cosmetics due to the fact that these compounds are stable and are not decomposed by heat or light like other caratenoids.

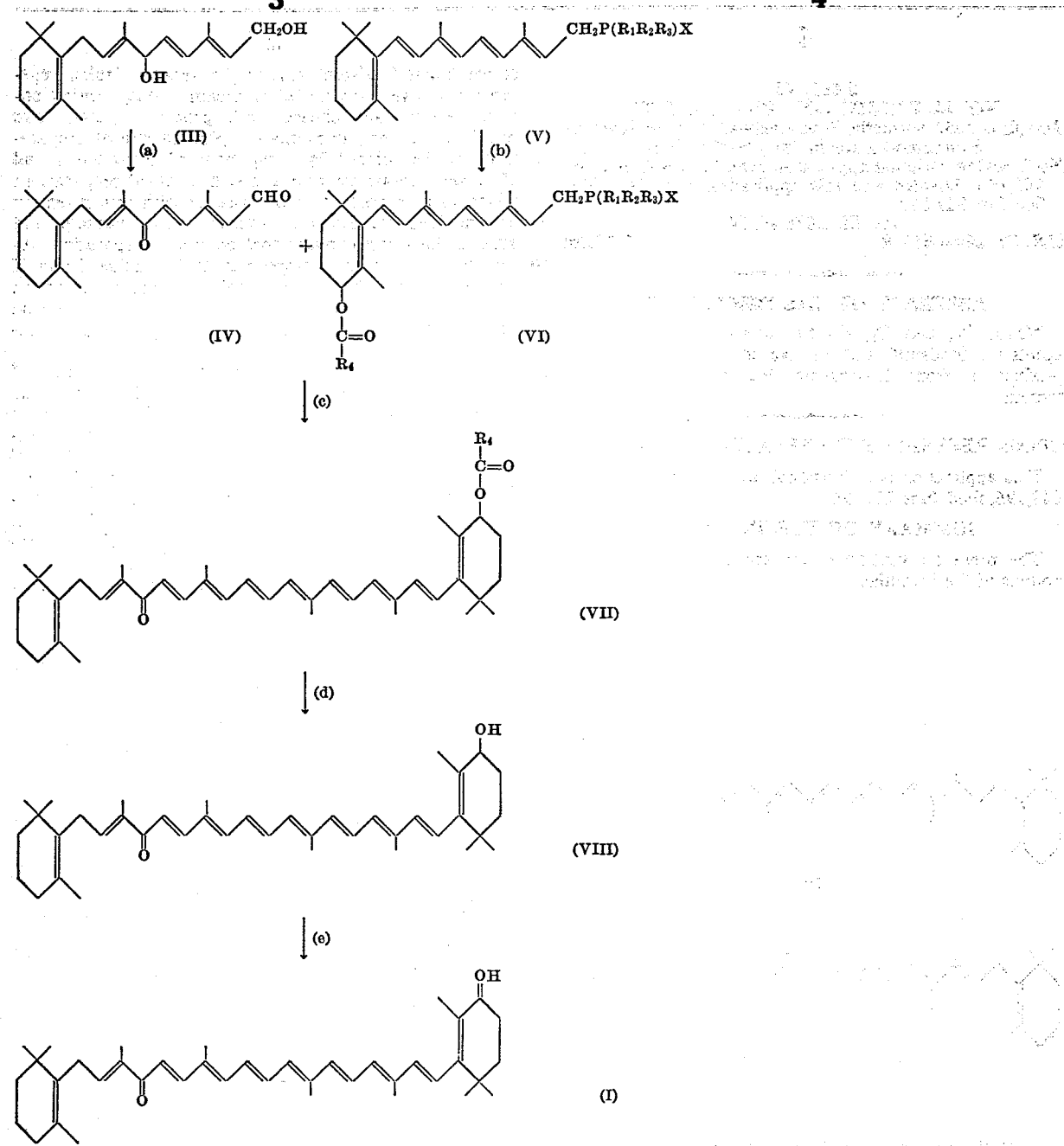

wherein $R_1$, $R_2$ and $R_3$ are selected from the group consisting of alkyl radicals containing from 1 to 14 carbon atoms, aryl radicals containing from 6 to 18 carbon atoms and aralkyl radicals containing from 7 to 23 carbon atoms; X is an anion of a mineral acid; and $R_4$ is lower alkyl or phenyl.

Hydroxenin (compound of Formula III above) is converted to the compound of Formula IV above, as in step (a) by means of oxidation. In carrying out the reaction of step (a), the compound of Formula III above is treated with an oxidizing agent under standard oxidizing conditions. Among the conventional oxidizing agents which can be utilized in carrying out the reaction of step (a) are included manganese dioxide, potassium permanganate, potassium dichromate, with manganese dioxide being the preferred oxidizing agent. This reaction is generally carried out in the presence of an inert organic solvent which is an aliphatic hydrocarbon, e.g., petroleum ether, hexane, heptane, etc., or a chlorinated hydrocarbon, e.g., chloroform, methylene chloride, ethylene dichloride, carbon tetrachloride, etc. In carrying out this oxidation reaction, temperature and pressure are not critical and the reaction can be carried out at room temperature or elevated temperatures. It is generally preferable to carry out this reaction at a temperature of from 20° C. to about 30° C.

The compound of Formula V above is prepared by reacting vitamin A with a phosphine of the formula:

$$\text{(V-a)}$$

wherein $R_1$, $R_2$, and $R_3$ are as above.

This reaction is generally carried out in the presence of an inert solvent utilizing a proton donor. Typical inert solvents which can be utilized include ethanol, benzene, tetrahydrofuran, diethyl ether, etc. Any conventional proton donor can be utilized in this reaction. Typical proton donors which can be employed in the above process include inorganic acids, such as the hydrohalic acids (especially hydrochloric or hydrobromic acid) or sulfuric acid. All acids which form acid addition salts with the phosphines of Formula V-a above (e.g., strong organic acids such as benzenesulfonic acid or trichloroacetic acid) can also be employed. Typical phosphines of Formula V-a above which can be reacted with vitamin A alcohol to produce the phosphonium salt of Formula V above, in accordance with this invention include triphenylphosphine, tritolyl-phosphine, diphenyltolyl-phosphine, trihexyl-phosphine, diphenyl-monomethyl-phosphine, diphenylmonodecyl-phosphine. The preferred phosphine of Formula V-a above is triphenyl-phosphine. In carrying out this reaction, temperature and pressure are not critical and this reaction can be carried out at room temperature as well as elevated or reduced temperatures.

The compound of Formula V above is converted to the compound of Formula VI above by treating the compound of Formula V above with a halogenating agent in the presence of an aliphatic carboxylic acid containing from 2 to 7 carbon atoms at a temperature of from $-40°$ C. to $20°$ C. In this manner, a halo group is substituted at the 5'-position of the cyclohexen-1-yl ring which is subsequently replaced with the carboxylic acid moiety. Generally, this reaction is carried out in the presence of a chlorinated hydrocarbon solvent such as chloroform, carbon tetrachloride, ethylene dichloride, etc.

The compound of Formula VII above is prepared by condensing the compound of Formula IV above with the phosphonium salt of Formula VI above. This condensation is carried out, in accordance with this invention, in the presence of a proton acceptor. The proton acceptors employed are preferably basic agents, e.g., strong bases such as alkali metal hydroxides, alkaline earth metal hydroxides, alkali metal amides, alkline earth metal amides, alkali metal alcoholates, alkaline earth metal alcoholates, ammonia, strongly basic amines, metallo-organic compounds, particularly Group I metallo-alkyl and Group I metallo-aryl compounds, such as lithium metal, lithium phenyl, sodium phenyl, sodium methyl, Grignard compounds, e.g., alkyl and aryl magnesium halides, etc. Sodium methoxide and potassium hydroxide are preferred although sodium amide has been found quite effective. The temperature of this reaction is not critical and room temperature can be utilized. Generally, it is preferred to carry out this condensation reaction at a temperature of from $10°$ C. to $40°$ C. Furthermore, it is generally preferred to carry out this condensation reaction in the presence of an inert organic solvent. The preferred solvents employed in this reaction are methanol, tetrahydrofuran, pyridine, isopropyl ether and ethyl ether, although any inert solvent may be employed.

The compound of Formula VII above is converted into the compound of Formula VIII above by treating the compound of Formula VII above as in step (d) with an alkali hydrolyzing agent. Any conventional alkali hydrolyzing agent can be utilized in carrying out this reaction. Among the conventional hydrolyzing agents which can be utilized are included sodium hydroxide, potassium hydroxide, etc. Generally, it is preferred to carry out this reaction by utilizing a lower aliphatic alcohol as the solvent medium. Among the preferred alcohols which can be utilized as the solvent medium in this reaction are included methanol, ethanol, etc. In carrying out the reaction of step (d), temperature and pressure are not critical and this reaction can be carried out at room temperature and pressure. However, if desired, elevated or lower temperatures can be utilized in carying out this reaction such as temperatures from $10°$ C. to about $100°$ C.

The compound of Formula VIII above is converted into the compound of Formula I above by treating the compound of Formula VIII above with an oxidizing agent in the same manner as recited with relation to oxidizing compounds of Formula III above in step (a). Generally, it is preferred to carry out the reaction of step (e) by heating the compound of Formula VIII above in the presence of aluminum tri(lower alkoxide) in the ketone solvent such as acetone, methyl ethyl ketone to the reflux temperature of the solvent. Any conventional ketone solvent such as the ketone solvents hereinbefore mentioned can be utilized in carrying out this reaction. Aluminum tri(lower alkoxide) which is used as a catalyst in this reaction includes for example aluminum tri(methoxide), aluminum tri(N-butoxide), aluminum tri(N-pentoxide), aluminum tri(isopropoxide), etc.

The $C_{50}$ diketo compound of Formula II above is prepared from hydroxenin by means of the following reaction scheme:

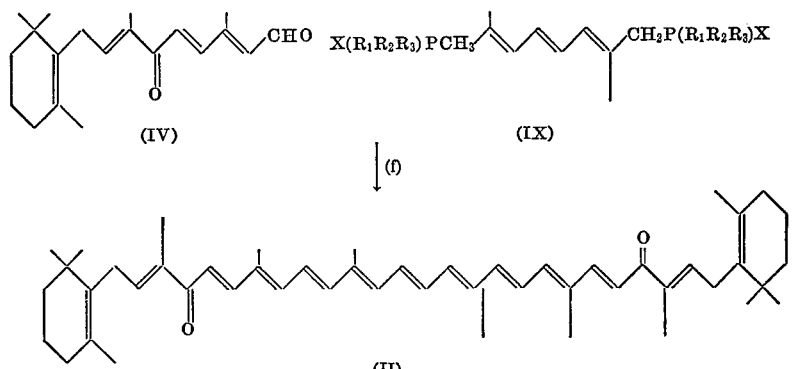

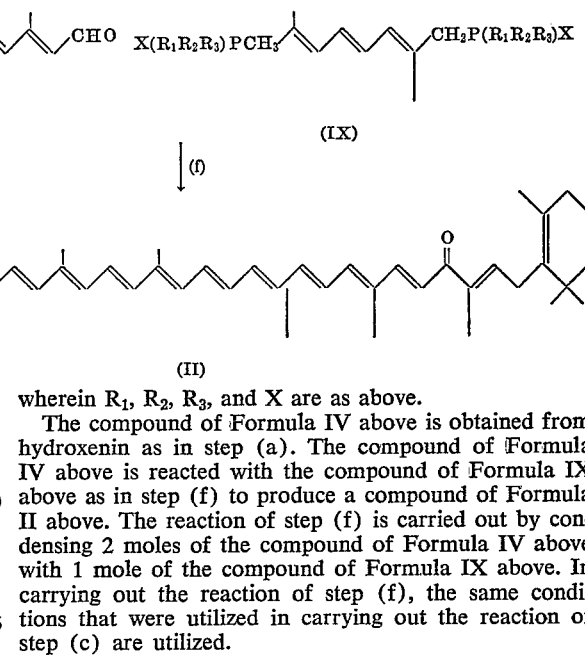

wherein $R_1$, $R_2$, $R_3$, and X are as above.

The compound of Formula IV above is obtained from hydroxenin as in step (a). The compound of Formula IV above is reacted with the compound of Formula IX above as in step (f) to produce a compound of Formula II above. The reaction of step (f) is carried out by condensing 2 moles of the compound of Formula IV above with 1 mole of the compound of Formula IX above. In carrying out the reaction of step (f), the same conditions that were utilized in carrying out the reaction of step (c) are utilized.

EXAMPLE 1

The oxidation of hydroxenin to form $C_{20}$ keto aldehyde

Hydroxenin (608 g.) was placed in a 12-liter flask with 4800 ml. of methylene chloride and 2.4 kg. of manganese dioxide. The reaction was stirred for 24 hours under an atmosphere of nitrogen. An additional 2.4 kg. of manganese dioxide was added, and the stirring was continued for 24 hours longer. The spent manganese dioxide was filtered, and it was washed with additional methylene chloride. The solvent was removed under vacuum to yield 1,6-diketo-3,7-dimethyl-9-[2',6',6'-trimethylcyclohexen-1'-yl]-nonatriene-2,4,7.

EXAMPLE 2

The preparation of crystalline vitamin A Wittig compound

Triphenylphosphine (528 g.) and methyl alcohol (3000 ml.) were placed in a 5-liter flask. Concentrated sulfuric acid (104 ml.) was added to the stirred mixture from a dropping funnel in 30 minutes; then stirring was continued at room temperature for 2 hours. Crystalline vitamin A acetate (584 g.) was added all at once, and the reaction was stirred under an atmosphere of nitrogen for 24 hours.

The methyl alcohol solvent was removed by distillation under vacuum without allowing the residue to heat above 50° C. The oily residue was warmed with 3200 ml. of acetone while stirring; then the solution was cooled in a refrigerator for 12 hours at 10° C. The Wittig salt of vitamin A which crystallized out was washed with additional acetone (20° C.) and dried under vacuum.

EXAMPLE 3

Preparation of 3-acetoxy vitamin A Wittig salt 126 g. of Wittig salt of vitamin A which was prepared according to Example 2 was dissolved in 2000 ml. of methylene chloride and the solution was cooled to −45° C. N-bromosuccinimide (50 g.) was dissolved in 1500 ml. of methylene chloride and 200 ml. of acetic acid and added to the vigorously stirred reaction over a period of five minutes. The stirring was then continued for an additional five minutes. Dimethylaniline (200 ml.) was added to the reaction flask and the solution was stirred for 30 minutes.

The reaction mixture was washed two times with 4000 ml. of 5 percent sulfuric acid, then four times with 200 ml. of water. After drying over anhydrous sodium sulfate, and removing the solvent under vacuum, the product 3-acetoxy vitamin A Wittig salt was obtained as a brown syrup.

EXAMPLE 4

Preparation of 1-(2,6,6 - trimethyl - 1 - cyclohexenyl)-18-(2,6,6-trimethyl - 3 - oxo - 1 - cyclohexenyl)-3,7,12,16-tetramethyloctadec-2,5,7,9,11,13,15,17-octaen-4-one The 3-acetoxy vitamin A Wittig salt which was prepared according to Example 3 was placed in a 2-liter reaction flask with 1200 ml. of benzene and 48 g. of the keto aldehyde. The stirred reaction mixture was cooled with an ice water bath to +10°, and a solution consisting of 100 g. of potassium hydroxide dissolved in 400 ml. of methyl alcohol was added from a separatory funnel, over a period of 30 minutes to produce 1-(2,6,6,-trimethyl - 1 - cyclohexenyl) - 18 - (2,6,6-trimethyl-3-acetoxy-1-cyclohexenyl) - 3,7,12,16 - tetramethyloctadec - 2,5,7,9, 11,13,15,17-octaen-4-one. A portion of this reaction mixture was extracted with methylene chloride. This extract was washed with water and concentrated to a syrup to produce 1 - (2,6,6-trimethyl-1-cyclohexenyl)-18-(2,6,6-trimethyl - 3 - acetoxy - 1 - cyclohexenyl)-3,7,12,16-tetramethyloctadec-2,5,7,9,11,13,15,17-octaen-4-one.

The portion of the reaction mixture which was not isolated was stirred continually at room temperature until thin layer chromatography analysis showed that the conversion was complete to the hydroxy carotenoid which was 1-(2,6,6-trimethyl - 1 - cyclohexenyl)-18-(2,6,6,-trimethyl - 3 - hydroxy - 1 - cyclohexenyl)-3,7,12,16-tetramethyloctadec-2,5,7,9,11,13,15,17-octaen-4-one. Six hours of stirring were required to complete the conversion.

The reaction mixture was diluted with 1000 ml. of water, the benzene layer was separated, and the water layer was extracted with an additional 500 ml. of benzene. The combined benzene layers were washed with water and concentrated to a red syrup under vacuum to produce the hydroxy carotenoid.

The hydroxy carotenoid was dissolved in 400 ml. of fresh dry benzene and placed in a reaction flask with 400 ml. of acetone and 100 g. of aluminum isopropoxide. The reaction was stirred at reflux temperature under an atmosphere of nitrogen for 12 hours.

The cooled reaction mixture was poured into 2000 ml. of water, and then 5 percent aqueous hydrochloric acid was stirred into the resulting suspension until the solid was all dissolved. The oil layer was separated, washed with water, and concentrated under vacuum to a thick red residue. The residue was taken up in 500 ml. of ethyl alcohol and cooled overnight in a refrigerator. The red crystalline solid which was formed was filtered by suction and dried under vacuum at 50° C. to produce 1-(2,6,6-trimethyl - 1 - cyclohexenyl) - 18 - (2,6,6 - trimethyl-3-oxo - 1 - cyclohexenyl) - 3,7,12,16 - tetramethyloctadec-2,5,7,9,11,13,15,17-octaen-4-one.

EXAMPLE 5

Preparation of 1,26-bis-(2,6,6-trimethyl - cyclohexenyl)-3,7,11,16,20,24 - hexamethyl - hexacosa-2,5,7,9,11,13, 15,17,19,21,24-undecen-4,23-dione 16.36 g. of 2,7-dimethyl-2,4,6-octatriene-1,8-di(ylidenetriphenylphosphine) was placed in a reaction flask with 12.0 g. of the keto aldehyde produced in Example 2, 200 ml. of methyl alcohol and 10 ml. of pyridine. A solution consisting of 4.5 g. of potassium hydroxide dissolved in 50 ml. of methyl alcohol was added from a dropping funnel at 10° C. in 30 minutes with vigorous stirring.

After 6 hours of stirring at room temperature, the red crystalline solid was filtered by suction and dried under vacuum. This crude product was recrystallized from benzene to yield the pure 1,26-bis-(2,6,6-trimethyl-cyclohexenyl)-3,7,11,16,20,-24-hexamethyl - hexacosa-2,5,7,9, 11,13,15,17,19,21,24-undecen-4,23-dione.

EXAMPLE 6

This example is directed to showing the use of compounds of the Formulae I and II as egg yolk pigmentors.

A group of four hens were dosed daily for sixteen days with 0.36 mg. of the compound of Formula I dissolved in 1.0 ml. of cottonseed oil. Another group of four hens were dosed daily for sixteen days with 0.36 mg. of the compound of Formula II dissolved in 1.0 mg. of cottonseed oil. A third group of four hens which were used as the control were not given any of the keto compounds of Formula I or Formula II. All eggs laid from the third day through the twentieth day were examined visually. The yolks of the eggs laid by the hens fed either the compound of Formula I or II had a good light yellow color about twice as brilliant as the yolk of the eggs laid by the control group.

I claim:

1. The compound having the formula:

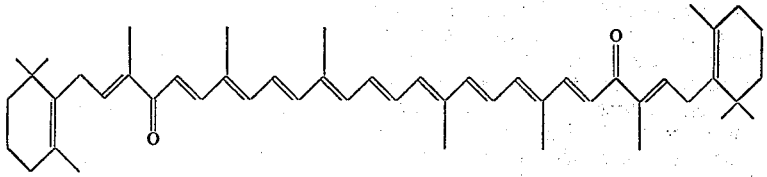

References Cited

UNITED STATES PATENTS 2,857,423   10/1958   Isler et al. _____ 260—586 R
3,478,104   11/1969   Surmatis _____ 260—586 R LEON ZITVER, Primary Examiner N. MORGENSTERN, Assistant Examiner U.S. Cl. X.R.

99—4, 148 C; 260—476 R, 488 R, 586 B, 606.5 P; 424—49, 63, 64, 366